(12) United States Patent
Staschik

(10) Patent No.: US 7,766,007 B2
(45) Date of Patent: Aug. 3, 2010

(54) SOLAR ENERGY COLLECTOR

(76) Inventor: Udo Staschik, 261 Albany Street, Winnipeg, MB (CA) R3J 2A9

( * ) Notice: Subject to any disclaimer, the term of this patent is extended or adjusted under 35 U.S.C. 154(b) by 148 days.

(21) Appl. No.: 12/021,952

(22) Filed: Jan. 29, 2008

(65) Prior Publication Data

US 2008/0178869 A1 Jul. 31, 2008

Related U.S. Application Data

(60) Provisional application No. 60/887,379, filed on Jan. 31, 2007.

(51) Int. Cl.
*F24J 2/24* (2006.01)
(52) U.S. Cl. .................. 126/663; 126/569; 126/634; 126/635; 126/655; 126/657; 126/685
(58) Field of Classification Search ............... 126/663, 126/634, 635, 655, 656, 657, 685, 569, 680; 60/641.11; 165/177, 178, 125
See application file for complete search history.

(56) References Cited

U.S. PATENT DOCUMENTS

| | | | | |
|---|---|---|---|---|
| 3,924,604 A | * | 12/1975 | Anderson | 126/606 |
| 4,136,674 A | * | 1/1979 | Korr | 126/607 |
| 4,245,618 A | * | 1/1981 | Wiener | 126/643 |
| 4,280,477 A | * | 7/1981 | Divine | 126/563 |
| 4,426,998 A | * | 1/1984 | DuBosque, Jr. | 126/623 |
| 4,557,252 A | * | 12/1985 | Dinh | 126/588 |
| 4,869,234 A | * | 9/1989 | Rapozo | 126/656 |
| 5,413,091 A | * | 5/1995 | Bourke | 126/598 |
| 5,507,275 A | * | 4/1996 | Clark | 126/627 |
| 5,660,164 A | * | 8/1997 | Rodriguez Sanchez | 126/640 |
| 6,931,851 B2 | * | 8/2005 | Litwin | 60/641.11 |

* cited by examiner

*Primary Examiner*—Kenneth B Rinehart
*Assistant Examiner*—Daniel A Bernstein
(74) *Attorney, Agent, or Firm*—Standley Law Group LLP

(57) ABSTRACT

A solar collecting apparatus for collecting solar energy in a heat transfer fluid includes an upper header member, a lower header member, and a plurality of collector tubes, each collector tube connected at an upper end thereof to the upper header member and connected at a lower end thereof to the lower header member. The collector tubes are arranged such that axes of the collector tubes form an array wherein no three adjacent axes are on the same plane, typically in a cylindrical or like array.

17 Claims, 1 Drawing Sheet

SOLAR ENERGY COLLECTOR

CROSS-REFERENCE TO RELATED APPLICATIONS

This application claims the benefit of U.S. Provisional Application No. 60/887,379, filed Jan. 31, 2007, which is hereby incorporated by reference in its entirety.

TECHNICAL FIELD

This invention relates to equipment for collecting solar energy and in particular to an apparatus for collecting solar energy in a heat transfer fluid such as water.

BACKGROUND OF THE ART

Solar hot water collection systems are well known in the prior art. A basic version of collecting heat from the sun is by means of water filled tubes, of a black color to absorb maximum heat from the sun, placed on a random shaped surface exposed to the sun.

Flat plate solar hot water panels are manufactured by integrating a tube type system filled with a heat transfer fluid into a metal absorption panel. Usually this metal panel is flat, black in color and placed in such a manner as to provide the largest surface area to the direct exposure of sunlight—capturing the sun's energy and transferring a portion of the thermal energy provided into usable heat. The flat metal plate is used to capture the thermal energy and the fluid circulating in the pipes embedded into the metal absorption panel transfers the captured heat into the hot water storage tank for end use.

Evacuated tube solar hot water panels operate by heating collection tubes carrying a heat transfer liquid. The collector tubes are located inside a glass tube, where air is removed from the glass tube. Multiple collection tubes are arranged in parallel along a plane surface to form what is basically again a planar collection surface. The sunlight passes through the outer glass tube and heats the collector tubes contained within it. To increase efficiency, usually the tubes are covered with a light-modulating coating.

Typically the collector tubes contain a liquid that vaporizes as it is heated. The vapor rises to a heat-transfer system positioned outside the collector tube in a pipe through which a second heat transfer liquid is pumped. This liquid is connected to the heat storage device in the building. In general, evacuated tube collectors heat to higher temperatures.

Fundamentally, these systems are operating by orienting a pipe or vessel containing a heat transfer fluid to extract as much heat as possible from the sun rays and transfer this heat gain into a usable commodity. The planar systems are oriented in a location that is selected according to the latitude and longitude of the installation location to maximize exposure to the sun.

The prior art planar systems use only one plane of absorption means to extract heat from the sun rays. As the sun moves through the day, the angle of the sun's rays striking the planar collector moves from a shallow inefficient angle in the morning, to a more efficient direct angle at mid-day, and back to the shallow angle in the evening. Furthermore the location of the sun changes through the seasons—seasonal adjustment of the orientation of the planar collector is often suggested or required. A fixed planar absorption plate can thus extract only a fraction of the available energy.

SUMMARY OF THE INVENTION

It is an object of the present invention to provide a solar collector that overcomes problems in the prior art.

The invention provides in a first embodiment a solar collecting apparatus for collecting solar energy in a heat transfer fluid. The apparatus comprises an upper header member, a lower header member, and a plurality of collector tubes, each collector tube connected at an upper end thereof to the upper header member and connected at a lower end thereof to the lower header member. The collector tubes are arranged such that axes of the collector tubes form an array wherein no three adjacent axes are on the same plane.

The invention provides in a second embodiment a solar collecting apparatus for collecting solar energy in a heat transfer fluid. The apparatus comprises an upper header member and a lower header member. A circulating tube is connected at an upper end thereof to a central portion of the upper header member and is connected at a lower end thereof to a central portion of the lower header member. Each of a plurality of collector tubes is connected at an upper end thereof to an outer portion of the upper header member and connected at a lower end thereof to an outer portion of the lower header member. The collector tubes are arranged such that axes of the collector tubes form an array wherein no three adjacent axes are on the same plane, and such that the circulating tube is substantially surrounded by collector tubes. The diameter of the circulating tube is greater than a diameter of any collector tube, and at least one of the upper and lower header members defines a port for connection to a fluid conduit.

The collector tubes are typically arranged to form a cylindrical array, but other configurations can be used where any three adjacent tubes are not on the same plane. In use, the apparatus is typically oriented such that the collector tubes are vertically oriented, with an upper header member and a lower header member in order to maximize exposure to the sun. A horizontal orientation could be used, but the heat gain capacity is reduced.

Due to the arrangement of the collector tubes it is not required to exactly align the apparatus with any best angle to maximize solar exposure and subsequent heat gain. The apparatus operates with similar functionality and efficiency regardless of the geographical location (longitude and latitude) of installation.

The collector tubes are coated with an appropriate coating to allow for best heat absorption, usually black. In order to generate the most heat gain from the sun, the solar collection area, or surface area of the tubes exposed to the sun should be increased by using an externally finned or rifled tube. In addition tubes with ridges or external pimple-like raised structures or star-shaped vertical finned tubes can be used to expand the solar collection area. Transfer of heat to the fluid inside the tubes can likewise be increased with internal fins or the like.

In one embodiment, a circulating tube, with a diameter larger than the diameter of the collector tubes, connects the central portion of the upper header to the central portion of the lower header, and is surrounded by collector tubes. Thus fluid is heated in the outer collector tubes and rises to the upper header, and flows downward in the circulating tube to the lower header, then back up again where further heat is collected in the fluid. Fluid lines can be connected to either header member to draw off the heated fluid.

To increase overall system efficiency a mirror like surface can be provided on the circulating tube. This mirror surface will reflect the sun rays which are not directly hitting the black collection tubes. By reflecting the sun rays and reflecting the sunrays back on to the "back side" or non-directly exposed surface of the collector tubes additional heat is gained. Adding the indirect secondary exposure generated by the reflection to the direct primary exposure of the collector tubes to the sun rays allows that the entire circumference of the collector tubes acts as a heat absorption surface. Also any sun rays that do not directly contact the black collector tubes on the exposed side, and also do contact the circulating tube, will contact the back surface of an opposite tube, where some energy will be absorbed by the contacted collector tube.

By using the reflective coating for the circulating tube, the circulating tube reflects the heat rather than collects the heat. In relation to the perimeter based collector tubes the liquid content of the circulating tube will remain cooler than the perimeter based collector tubes, creating a siphoning effect. The slightly colder water inside the circulating tube with the reflective coating falls down and siphons the hot water from the top header down. Simultaneously it pushes the colder water from the circulating tube through the perimeter based heat absorption pipes. This siphoning effect results in a more even warming of a larger amount of water, therefore more heat energy can be absorbed before the generated heat is exchanged into the hot water storage tank.

A multi planar organization of the heat absorption tubes to a large extent eliminates the disadvantages of flat surface planar systems and allows for a more simplified and optimized extraction of heat energy from the sun. A multi planar extraction means consists of a stand-alone structure, typically oriented vertically.

The vertical structure can be manufactured as self supporting entity without any requirement to be supported or braced. The self supporting vertical structure will be secured to a roof, ground mounted pad, pillar, or similar support anchoring structure.

Each collector tube is placed at a predetermined distance and on a different plane from the adjacent pipe; in most cases the vertical collector tube assembly will take a cylindrical shape, but heptagonal, octagonal or any other polygonal or even random spacings (including concave, convex or back mirrored) are possible and desirable as long as a predetermined void space between vertical collector tubes is maintained and no three adjacent tubes are in the same plane.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
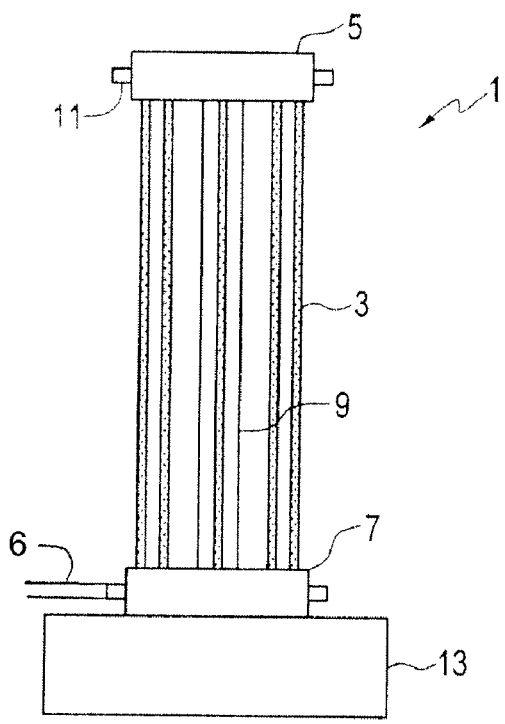
FIG. 1 is a side view of an embodiment of the solar collecting apparatus of the present invention.
Figure 2:
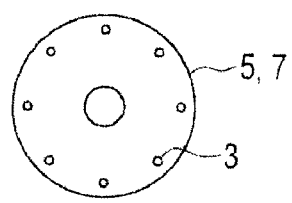
FIG. 2 is a schematic view of the orientation of the collector tubes of the embodiment of FIG. 1.

FIGS. 1 and 2 illustrate a solar collecting apparatus 1 of the present invention for collecting solar energy in a heat transfer fluid. The apparatus 1 comprises a plurality of collector tubes 3, and each collector 3 is connected at an upper end to an upper header member 5 and at a lower end to a lower header member 7. The collector tubes 3 are typically arranged to form a cylindrical array, generally as schematically illustrated in FIG. 2, but other configurations can be used where the axes of no three adjacent tubes 3 are on the same plane. It is contemplated that he collector tubes 3 can be located with centers thereof on the corners of virtually any polygon, or randomly.

Figure 3:
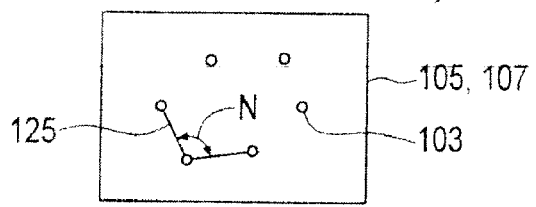
FIG. 3 is a schematic view of the orientation of the collector tubes of an alternate embodiment of the solar collecting apparatus of the present invention.

For example in the arrangement of an alternate embodiment 101 schematically illustrated in FIG. 3 the headers 105, 107 are generally rectangular, while the collector tubes 103 are somewhat randomly oriented. It can be seen however that in the random configuration of FIG. 3, lines 125 drawn from any tube 103 to adjacent tubes 103 form an obtuse angle N that is between 90 and 180 degrees. Each collector tube 103, and also each collector tube 3 in FIGS. 1 and 2, is thus exposed to sunlight and un-shaded by adjacent collector tubes through at least 180 degrees.

It is contemplated that the apparatus 1 will typically be oriented with the collector tubes 3 oriented upright, substantially vertically, in order to maximize exposure to the sun as the sun moves throughout the day relative to the apparatus 1. It may be that a horizontal orientation might be used in some applications however it is contemplated that the heat gain capacity would be reduced as the lower collector tubes 3 would not be exposed to the sun.

Figure 4:
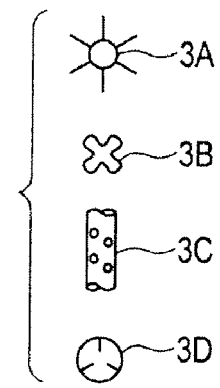
FIG. 4 is a schematic sectional view of two collector tubes suitable for use with the invention to expand the surface area of the collector tubes.

The collector tubes 3 are coated with an appropriate coating to allow for best heat absorption, usually black. In order to generate the most heat gain from the sun, the solar collection area, or surface area of the tubes 3 exposed to the sun could be increased by using an externally finned or rifled tube. Vertical finned tubes 3A, tubes with external pimple-like raised structures 3B, and pitted surfaces 3C as illustrated in FIG. 4 would expand the solar collection area. Corrugation, twisting, sandblasting, or similar means can be used as well. Transfer of heat to the heat transfer fluid inside the collector tubes can likewise be increased with internal fins, ridges, corrugations, pits, recesses, or the like. The pimple-like raised structure 3B for example increases both the inner and outer surface areas of the tube 3B. Internal fins are illustrated in the tube 3D.

In the illustrated embodiment of the apparatus 1, a central circulating tube 9, with a diameter larger than the diameter of the collector tubes 3, connects the central portion of the upper header 5 to the central portion of the lower header 7. The collector tubes 3 are connected to outer portions of the upper and lower header members 5, 7 such that the circulating tube 9 is substantially surrounded by collector tubes 3. Thus fluid is heated in the outer collector tubes 3 and rises to the upper header 5, and flows downward in the circulating tube 9 to the lower header 7, then back up again through the collector tube 3 where further heat is collected in the fluid. Conduits 6 to circulate heated fluid can be connected to either header member 5, 7 at ports 11 to draw off the heated fluid.

To increase overall system efficiency a mirror like surface can be provided on the circulating tube 9. This mirror surface will reflect the sun rays which are not directly hitting the black collection tubes 3. By reflecting the sun rays back on to the "back side" or non-directly exposed surface of the collector tubes 3 additional heat is gained. Adding the indirect secondary exposure generated by the reflection to the direct primary exposure of the vertical collector tubes 3 to the sun rays allows substantially the entire circumference of the collector tubes 3 to act as a heat absorption surface.

By using the reflective coating for the circulating tube 9, the circulating tube 9 reflects the heat rather the collects the heat. In relation to the perimeter based collector tubes 3 the liquid content of the circulating tube 9 will remain cooler than the collector tubes 3. Cold water is heavier than warmer water; therefore this piping arrangement creates a siphoning effect: The slightly colder water inside the circulating tube 9 with the reflective coating falls down and pulls the hot water from the top header member 5 downward, pushing the colder water from the circulating tube 9 downward then up through the collector tubes 3. This effect results in a more even warming of a larger amount of water, therefore more heat energy can be absorbed before the generated heat is exchanged into a hot water storage tank.

The vertical self supporting structure of the solar collecting apparatus 1 allows for the integration of additional features. For example a hot water storage tank 13 can be integrated into the bottom part of the apparatus 1, which in fact could act as a load bearing footing or anchor for the entire structure. The entire structure can be assembled to create a stand alone shower unit where cold water enters the unit, the vertical solar collector tubes heat the water, a pump pumps the water, a thermostatic mixing valve tempers the water temperature to the desirable temperature for use and a shower head is mounted directly onto the self supporting solar pin structure. A multitude of apparatuses 1 can be connected in parallel or series to heat a larger volume of water.

Figure 5:
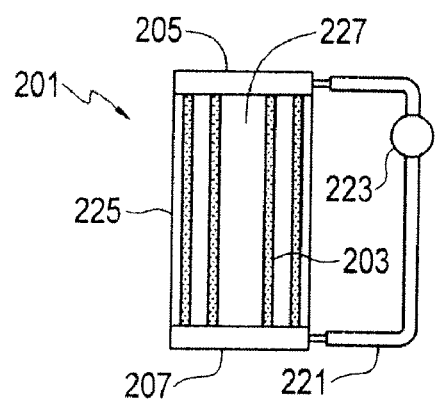
FIG. 5 is a side view of an alternate embodiment of the solar collecting apparatus of the present invention.

FIG. 5 illustrates an alternate embodiment of the apparatus 201 where the upper and lower headers 205, 207 are connected to a source of circulating fluid provided by conduits 221 and pump 223, such that fluid flows into one of the upper and lower headers and out of the other of the upper and lower headers. The fluid could be circulated through the collector tubes 203 continuously to increase the temperature of the fluid, or the apparatus 201 could act as a pre-heater where the fluid simply passes through the collector tubes once on its way to another location. The apparatus 201 also includes a transparent shell 225. The illustrated shell 225 extends from the perimeter of the upper header 205 down to the perimeter of the lower header 207 to retain heat inside an enclosure 227 formed by the shell 225 and the upper and lower headers 205, 207. Air could be evacuated from the enclosure 227 to further reduce heat loss.

Due to the arrangement of the collector tubes 3 it is not required to exactly align the apparatus 1 with any best angle to maximize solar exposure and subsequent heat gain. The apparatus 1 operates with similar functionality and efficiency regardless of the location (longitude and latitude) of installation.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A solar collecting apparatus for collecting solar energy in a heat transfer fluid, the apparatus comprising:
    an upper header member;
    a lower header member;
    a plurality of collector tubes, each collector tube connected at an upper end thereof to the upper header member and connected at a lower end thereof to the lower header member;
    wherein the collector tubes are arranged such that axes of the collector tubes form an array wherein no three adjacent axes are on the same plane;
    a circulating tube connected at an upper end thereof to the upper header member and connected at a lower end thereof to the lower header member, wherein a diameter of the circulating tube is greater than a diameter of any collector tube, and wherein at least one of the upper and lower header members defines a port for connection to a fluid conduit;
    wherein the circulating tube is connected to central portions of the upper and lower header members, and wherein the collector tubes are connected to outer portions of the upper and lower header members such that the circulating tube is substantially surrounded by collector tubes.

2. The apparatus of claim 1 wherein the axes of the collector tubes form an array that is one of cylindrical, polygonal, and random.

3. The apparatus of claim 1 wherein a line drawn from a first collector tube axis to a second collector tube axis and then to a third collector tube axis forms an obtuse angle at the second collector tube.

4. The apparatus of claim 1 adapted to be mounted in a location exposed to solar rays such that the collector tubes are oriented substantially vertically.

5. The apparatus of claim 1 wherein the collector tubes are configured to increase a surface area of the collector tubes.

6. The apparatus of claim 5 wherein at least one collector tube includes at least one of fins, ridges, corrugations, pits, and recesses defined in one of the outer surface thereof and the inner surface thereof.

7. The apparatus of claim 1 wherein the upper and lower headers are connected to a source of circulating fluid such that fluid flows into one of the upper and lower headers and out of the other of the upper and lower headers.

8. The apparatus of claim 1 wherein a surface of the circulating tube is reflective.

9. The apparatus of claim 1 wherein the lower header member is supported on a tank, and is connected to the tank such that water in the tank is heated by solar rays contacting the collector tubes.

10. The apparatus of claim 1 further comprising a transparent shell enclosing the collector tubes and operative to retain heat inside an enclosure formed by the shell.

11. The apparatus of claim 10 wherein the shell extends from the upper header down to the lower header to form the shell.

12. The apparatus of claim 10 wherein air is evacuated from the enclosure.

13. A solar collecting apparatus for collecting solar energy in a heat transfer fluid, the apparatus comprising:
    an upper header member;
    a lower header member;
    a circulating tube connected at an upper end thereof to a central portion of the upper header member and connected at a lower end thereof to a central portion of the lower header member;
    a plurality of collector tubes, each collector tube connected at an upper end thereof to an outer portion of the upper header member and connected at a lower end thereof to an outer portion of the lower header member;

wherein the collector tubes are arranged such that axes of the collector tubes form an array wherein no three adjacent axes are on the same plane, and such that the circulating tube is substantially surrounded by collector tubes;

wherein a diameter of the circulating tube is greater than a diameter of any collector tube, and wherein at least one of the upper and lower header members defines a port for connection to a fluid conduit.

14. The apparatus of claim 13 wherein a surface of the circulating tube is reflective.

15. The apparatus of claim 13 wherein the lower header member is supported on a tank, and is connected to the tank such that water in the tank is heated by solar rays contacting the collector tubes.

16. The apparatus of claim 13 further comprising a transparent shell extending from the upper header down to the lower header to form the shell and operative to retain heat inside an enclosure formed by the shell.

17. The apparatus of claim 16 wherein air is evacuated from the enclosure.

* * * * *